W. M. FULTON.
THERMOSTATIC REGULATING DEVICE.
APPLICATION FILED APR. 21, 1919.
1,404,844.
Patented Jan. 31, 1922.
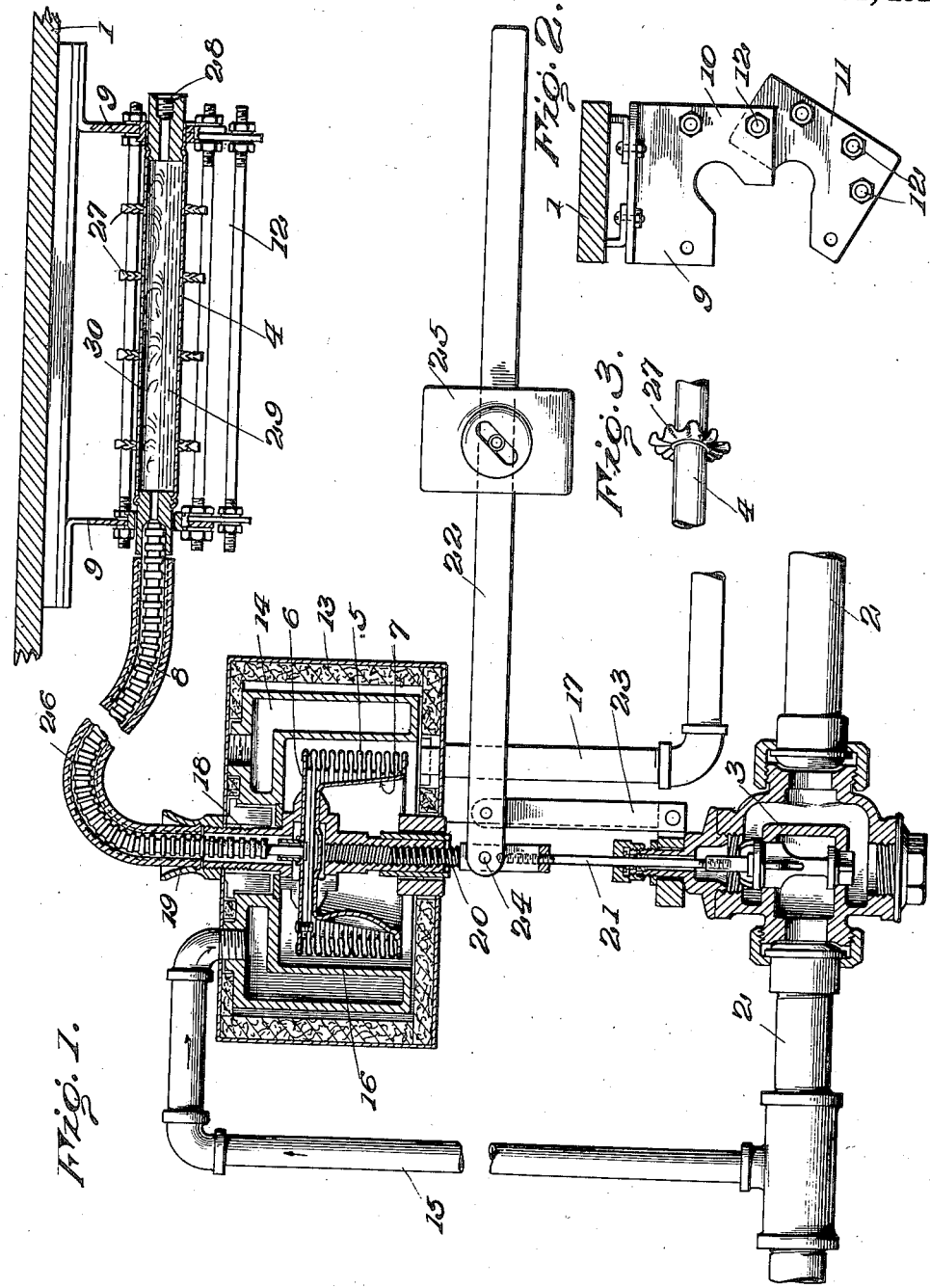

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

THERMOSTATIC REGULATING DEVICE.

1,404,844.     Specification of Letters Patent.     Patented Jan. 31, 1922.

Application filed April 21, 1919. Serial No. 291,781.

*To all whom it may concern:*

Be it known that I, WESTON M. FULTON, a citizen of the United States of America, and a resident of Knoxville, Tennessee, have invented a new and useful Improvement in Thermostatic Regulating Devices, which invention is fully set forth in the following specification.

This invention relates to thermostatic regulating devices and, more particularly, to devices of this character which employ a volatile liquid as the temperature-responsive medium.

It has heretofore been proposed to provide a thermostatic regulating device comprising a container for a volatile liquid and a motor vessel in communication therewith, said container being in heat-interchanging relation with the medium the temperature of which is to be controlled and having the volatile liquid therein, and said motor vessel containing the vapor of said liquid. In the operation of these devices, the liquid in the container vaporizes at or about the desired operating temperature and the vapor is intended to pass over into the motor vessel and, by expansion of the latter, operate the means to be controlled. As the motor vessel, however, is normally at a lower temperature than that of the container, experience has demonstrated that the vapor condenses as it passes over to the vessel, especially if an intermediate tube be employed, and fails to exert the necessary pressure until the entire system has become sufficiently heated to prevent such condensation. Consequently, there is a considerable and highly-undesirable time lag in the operation of these devices. Furthermore, where a tube is used as the means of communication between the container and the motor vessel, the condensation in the tube results in the formation of disconnected slugs of liquid which are forced over into the vessel intermittently and, by the intermittent release of the vapor separating such slugs, produce an irregular or jerky motion of the vessel and the means to be controlled.

It has also been proposed, as in the patent to Segesvary, No. 950,306, granted February 22, 1910, to position the motor vessel in heat-interchanging relation with the heating medium, the flow of which is to be controlled, and fill the container and intercommunicating pipe with the volatile liquid. Thereby the vapor in the vessel is maintained at a higher temperature than the liquid in the container and pipe. In the operation of these devices the liquid in the container expands upon rise in temperature and, by volumetric expansion, forces successive drops of the liquid into the hot chamber of the motor vessel wherein it is volatilized and a pressure developed to operate the means to be controlled. Devices of this type, however, have numerous and grave disadvantages, among the more important of which may be noted that, as the supply of liquid to the hot chamber depends upon volumetric expansion, a relatively large mass of liquid must be used in order to obtain sufficient expansion thereof with small temperature changes to supply the hot vessel with a sufficient amount of the liquid to be volatilized to operate the means to be controlled, and a large mass of liquid is very sluggish in responding to temperature variations; again, the successive drops of liquid as they enter the hot chamber volatilize with almost an explosive effect so as to produce an irregular or jerky motion of the means to be controlled.

To overcome the disadvantages of using the vapor of the volatile liquid as the power-transmitting medium of the thermostat, it has been suggested in my prior patent No. 1,102,035, granted June 30, 1914, to fill the vessel and communicating tube with liquid and retain the vapor in the container by the trapping of the same therein. This construction not only requires the use of a relatively large volume of liquid in the vessel and tube but, in order to maintain the vapor trapped in the container, the latter must contain not only sufficient liquid to maintain the trapped relation when the vessel is expanded but also, when the vessel is contracted, an additional quantity of liquid equal to the volumetric expansion of the vessel. Consequently, the container has therein a relatively large mass of liquid which must be heated to effect the operation of the device and, while this construction has proved satisfactory where the container is in heat-interchanging relation with a medium of good conductivity or high specific heat, it has been found to possess an undesirable time lag when subjected to a medium of relatively low conductivity or low specific heat.

It is an object of this invention to provide a thermostatic regulating device employing a volatile liquid which utilizes the vapor of said liquid as the power-transmitting medium while avoiding both the sluggishness and irregularity of movement arising from improper condensation of the vapor and the sluggishness and irregularity of movement arising from volumetric expansion of a liquid and its sudden vaporization in a hot chamber.

A further object of the invention is to provide a thermostatic regulating device that is sensitive when in heat-interchanging relation with media of low conductivity or low specific heat and which, upon the occurrence of small temperature changes, is capable of developing relatively large power for operating a means to be controlled.

Another object of the invention is to provide an improved thermostatic regulating device which increases in sensitiveness as the temperature rises. A further object is to provide a thermostatic regulating device which employs the vapor of a volatile liquid under such conditions that the vapor acts more nearly in accordance with the laws of expansion and contraction of perfect gases. A still further object is to provide an improved thermostatic regulating device that avoids irregularity of movement and operates the means to be controlled smoothly and steadily. Other objects relate to the provision of an improved thermostatic regulating device which enables the container of volatile liquid to be situated relatively remote from the motor vessel without sacrificing any of the advantages above referred to; which employs a relatively small volume of the volatile liquid; which is light and compact and inexpensively manufactured and installed; and which is sensitive and efficient in operation.

Stated broadly, the invention comprises a thermostatic regulating device including, in combination with a means to be controlled and a source of heat, a container for a volatile liquid and a motor vessel operatively connected to the means to be controlled and in communication with said container, preferably through an interposed tube which may be flexible and under some circumstances is heat-insulated, said container constituting a vaporizing chamber for said liquid and said vessel containing the vapor of said liquid and being in heat-interchanging relation with said source of heat whereby the vapor therein is maintained at a temperature above that of the container.

The invention is capable of receiving a variety of mechanical expressions only one of which is shown on the accompanying drawing, but it is to be expressly understood that the drawing is for purposes of illustration only and is not to be construed as a definition of the limits of the invention reference being had to the appended claims for that purpose.

In said drawings, Figure 1 is an elevation, partly in section, of a thermostatic regulating device embodying the present invention.

Fig. 2 is a detail illustrating a convenient means for supporting the container in position, and Fig. 3 is a detail illustrating a provision of means to facilitate the ready absorption and radiation of heat by the container.

The invention has special utility when applied to the control of a valve in the heating system of a dry kiln and is illustrated on the drawing as embodied in a dry kiln regulator, but it is to be expressly understood that the invention is not restricted in its use to this application of the same for it is capable of a wide variety of uses.

Referring in detail to the drawing, 1 designates the wall of a dry kiln which is to be supplied with heat in any suitable way, as by a heating medium conveyed by conduit 2 in which is a valve 3 of any suitable construction for controlling the flow of said medium.

A thermostat subjected to the air within kiln 1 is provided for controlling the valve 3, said thermostat in accordance with my invention containing a volatile liquid and utilizing the vapor of said liquid as the power-transmitting medium. In the form shown, this thermostat comprises a container 4 of any suitable construction, illustrated as a bulb of tubular or cylindrical formation, a motor vessel 5 of any suitable construction, illustrated as an expansible and collapsible corrugated vessel having a stationary end wall 6 and a movable end wall 7, and, by preference, an interposed tube 8 constituting a means of communication between said container and vessel, said tube desirably being flexible for convenience of installation and of any suitable length in accordance with the desired locations of the valve and the container.

The container 4 may be supported in heat-interchanging relation with the air or other medium the temperature of which is to be controlled in any suitable way. In the form shown a pair of brackets 9 are suitably attached to the wall of the kiln and are constructed of two hingedly-connected portions 10 and 11 to facilitate insertion and withdrawal of the container. Bolts 12 may be employed as a connecting means between the brackets 9 to give rigidity to the structure, in which event one of said bolts may constitute a hinge for the parts 10 and 11 and another of said bolts may constitute the means for connecting said parts in operative position.

In accordance with the present invention the motor vessel 5 is maintained in heat-interchanging relation with a source of heat and, where the thermostat is applied to the regulation of a source of heat, the heating medium itself may be conveniently used for heating said vessel. In the form shown, the vessel 5 is mounted in a heat-insulating casing 13 of any suitable construction and containing a heating chamber supplied with heating medium from the main heat supply conduit in any suitable way. The casing 13 is shown as divided into an outer annular compartment 14 which is in communication with the conduit 2 through a pipe 15, and an inner compartment 16 in which is positioned the motor vessel 5, a pipe 17 leading from said outer compartment 14 to a suitable trap or to said conduit 2 on the opposite side of the valve 3. The compartment 14 therefore constitutes a heating jacket for the inner compartment 16 and its contained vessel 5. However, any other suitable arrangement for conveying a heating medium into heat-interchanging relation with said vessel 5 may be employed if desired.

Vessel 5 is retained in the casing 13 in any suitable way, being shown as provided on its stationary end wall with a threaded hollow stem 18 which passes through an opening in the wall of the casing and is secured in position by a nut 19. If the communicating conduit 8 be flexible said nut may desirably be made of the flared construction shown to prevent the tube being bent sharply where it enters the casing. The movable end wall 7 of the vessel is operatively connected to the valve 3 in any suitable way as by a threaded stem 20 attached to the valve stem 21. Suitable means are also preferably provided for opposing movement of the valve in one direction, such means being desirably adjustable, and in the form shown a lever 22 is pivotally mounted on a bracket 23 and pivotally connected to the stem 20 at 24, said lever carrying a weight 25 which is preferably adjustable. In place, however, of the adjustable weight an adjustable spring could be employed to oppose expansion of the vessel.

If the interposed tube 8 pass through a medium the temperature of which is below the temperature to which the container 4 is subjected, it is preferably encased in whole or in part in heat-insulating material 26 as shown. Said tube is preferably integrally connected to the container and vessel, as by brazing, to avoid leakage or tampering with the connections.

To facilitate the absorption and radiation of heat by the walls of the container 4, the latter may be provided with one or more fins 27, shown as corrugated and suitably mounted at intervals along the length of the container.

In charging the thermostat, the motor vessel and container are exhausted, preferably substantially to a vacuum, and a relatively small quantity of any suitable volatile liquid is introduced into the container, a filling opening closed by a screw plug being illustrated at 28. In installing the thermostat, the motor vessel and container are so arranged that the volatile liquid in the container cannot run over into the vessel, and the vessel is then connected up with the valve or other means to be controlled. The use of a flexible tube between the container and motor vessel provides for considerable flexibility of installation and, by a proper selection of the length of the tube, the vessel may be positioned relatively remote from the container. When installed the volatile liquid only partly fills the container 4 as shown at 29, leaving a vapor space 30 above the liquid which is in communication with the motor vessel 5 through the intercommunicating tube 8. Said vessel and tube, as well as the vapor-space in the container, are accordingly filled with the vapor of the volatile liquid.

Assuming that the kiln is at atmospheric temperature and that the heating medium is being supplied through conduit 2, the volatile liquid in the container 4 is at atmospheric temperature and the vapor in the space 30 has a tension corresponding to the temperature of the liquid. The heating medium, however, flows through the by-pass constituted by pipe 15, casing 13 and pipe 17, and heats the vapor in the motor vessel 5. As the temperature in the kiln rises, the temperature of the volatile liquid in the container 4 correspondingly rises and, as there is but a relatively small mass of this liquid, with only a very small time lag. Furthermore as this liquid rises in temperature, some of it passes over into vapor to maintain a vapor tension corresponding to the temperature of the liquid. Therefore, the mass of liquid in the container 4 is constantly decreasing and, as the time lag decreases with the mass of liquid to be heated, the sensitiveness of the device constantly increases as the temperature approaches that at which the kiln is to be maintained. At the latter temperature, the liquid in the container 4 promptly responds and vapor is formed rapidly, the same passing over into the motor vessel 5 to expand the latter against the opposition of the weight 25 and therefore partially or entirely close the valve 3 and diminish or cut off the supply of heating medium.

As the heating medium is at a temperature above that of the air in the kiln, the vapor in the motor vessel 5 is maintained at a temperature above that of the container 4, whereby there is no opportunity for condensation, and therefore no retardation in the response of the vessel to the vapor, as it passes over to the motor vessel. Furthermore, as the formation of vapor is regular there is nothing to produce an irregular or jerky motion of said vessel.

As the temperature within the kiln falls the temperature of the volatile liquid in the container 4 correspondingly falls, accompanied by a corresponding condensation and decrease of vapor tension in said container. Vapor consequently returns from the motor vessel to the container and the weight or other means operates the former to partially or entirely open the valve 3. Thereby the temperature of the air in the kiln may be kept substantially uniform, the thermostat responding sensitively to slight temperature changes to adjust the position of the valve so as to maintain that supply of heating medium which will retain the desired temperature in the kiln.

When an interposed tube 8 is employed it should be maintained at a temperature not lower than that of the container 4; consequently if the tube passes through a region of lower temperature than that of the container it should be provided with heat insulation 26 as shown, so as to prevent condensation in such portion of the tube.

It will therefore be perceived that a thermostatic regulating device has been provided which utilizes the vapor of a volatile liquid as the power-transmitting medium without condensation of the vapor so as to retard the action of the device and without irregularity of motion owing to such condensation, and one which, at the same time, is very sensitive because relying upon vaporization rather than volumetric expansion in responding to temperature variations while avoiding any irregularity of motion due to sudden or explosive vaporization.

While the thermostat disclosed is highly useful when used in heat-interchanging relation with liquids and solids, or media of high conductivity or specific heat, it has especial utility when used in heat-interchanging relation with gases, or media of low conductivity or specific heat, because the amount of heat per unit volume which a gas can give up to a thermostat is relatively small and, if the temperature-responsive medium is of large mass, the number of unit volumes of gas which must pass over the thermostat in order to increase its temperature is correspondingly large; therefore its time lag is proportionately great. A thermostat constructed in accordance with the present invention, however, contains only a relatively small mass of volatile liquid to be heated, whereby it responds sensitively to the temperature variations of media of low conductivity or specific heat and, as such mass is constantly decreasing as the temperature rises, the sensitiveness of the device continually increases as the operating temperature is approached.

Furthermore, as the temperature of the motor vessel 5 is always above the temperature of the container 4 the vapor in said vessel is superheated. Consequently, the vapor in passing from the container to the vessel not only increases in volume correspondingly to the increase in temperature but, becoming superheated, the vapor more nearly acts in accordance with the laws of perfect gases. Therefore by superheating the vapor it may be said that a twofold increase of volume is obtained and, conversely, when the superheated vapor returns from the vessel, a twofold decrease of volume is obtained. This enables a more efficient use of the vapor of the volatile liquid because an operating pressure is obtained by vaporizing a smaller quantity of liquid, which also results in a corresponding decrease in time lag as well as a decrease in the quantity of liquid that need be used.

It will furthermore be perceived that a thermostatic regulating device has been provided which employs a relatively small volume of volatile liquid; which is light and compact and inexpensively manufactured and installed; which is highly sensitive and develops relatively great power upon the occurrence of small changes of temperature; which operates smoothly and regularly; which is highly efficient in utilizing the power developed by the volatilization of a liquid; which is prompt in responding to temperature changes; and which, while capable of a wide variety of uses, is especially suitable for regulating the temperature of air, as in a dry kiln.

While the embodiment of the invention illustrated on the drawings has been described with considerable particularity, it is to be expressly understood that the invention is not restricted thereto, as the same is capable of receiving a variety of mechanical expressions, some of which will readily suggest themselves to those skilled in the art, while certain features thereof are capable of use without other features thereof. Reference is therefore to be had to the claims hereto appended for a definition of the limits of the invention.

What is claimed is:

1. In combination with a source of heat and means for controlling the same, a thermostat comprising a container in heat-interchanging relation with the medium the temperature of which is to be controlled and having a volatile liquid partly filling the same and a motor vessel in communication with said container and operatively connected to said controlling means, said motor vessel containing the vapor of said liquid and being continuously in heat-interchanging relation with said source of heat whereby the vapor therein is maintained at a temperature above that of said container.

2. In combination with a source of heat and means for controlling the same, a thermostat comprising a container in heat-interchanging relation with the medium the temperature of which is to be controlled and having a volatile liquid therein and a motor vessel communicating with said container through a tube and operatively connected to said controlling means, said motor vessel and tube containing the vapor of said liquid and the vapor in said vessel being continuously in heat-interchanging relation with said source of heat whereby the same is maintained at a temperature above that of said container.

3. In combination with a source of heat and means for controlling the same, a thermostat comprising a container in heat-interchanging relation with the medium the temperature of which is to be controlled and having a volatile liquid therein and a motor vessel communicating with said container through a heat-insulated tube and operatively connected to said controlling means, said motor vessel and tube containing the vapor of said liquid and the vapor in said vessel being continuously in heat-interchanging relation with said source of heat whereby the same is maintained at a temperature above that of said container.

4. In combination with a source of heat and means for controlling the same, a thermostat comprising a container in heat-interchanging relation with the medium the temperature of which is to be controlled, said container being provided with heat-conducting projections and partly filled with a volatile liquid, and a motor vessel communicating with said container and operatively connected to said controlling means, said motor vessel containing the vapor of said liquid and being continuously in heat-interchanging relation with said source of heat whereby the vapor therein is maintained at a temperature above that of said container.

5. In combination with a source of heat and means to be controlled, a thermostat comprising a container having a volatile liquid partly filling the same and a motor vessel in communication with said container and operatively connected to said means to be controlled, said motor vessel containing the vapor of said liquid and being continuously in heat-interchanging relation with said source of heat whereby it is always at a temperature above that of said container.

6. In combination with means to be controlled, a thermostat comprising a container having a volatile liquid and a vapor space therein and a motor vessel in communication with said container and operatively connected to said means to be controlled, said motor vessel containing the vapor of said liquid, and means for continuously maintaining the temperature of the vapor in said vessel above the temperature of said container.

7. In combination with means to be controlled, a thermostat comprising a container having a volatile liquid and a vapor space therein and a motor vessel in communication with said container and operatively connected to said means to be controlled, said motor vessel containing the vapor of said liquid and being continuously subjected to a source of heat so that the vapor in said vessel is maintained above the temperature of said container, and means for opposing movement in one direction of said means to be controlled.

8. In combination with means to be controlled, a thermostat comprising a container having a relatively small mass of volatile liquid partly filling the same and a motor vessel operatively connected to said means to be controlled and in communication with said container, the space in said vessel being occupied by the vapor of said liquid, and means for continuously maintaining the vapor in said vessel at a higher temperature than that of said container.

9. In combination with means to be controlled, a thermostat comprising a container having a volatile liquid and a vapor space therein and a motor vessel operatively connected to said means to be controlled and in communication with said container, the space in said vessel being occupied by the vapor of said liquid, and a source of heat with which the vapor in said vessel is always in heat-interchanging relation.

10. In combination with a source of heat and means to be controlled, a thermostat comprising a container having a volatile liquid therein and a motor vessel operatively connected to said means to be controlled and communicating with said container through an interposed tube, said vessel and tube containing the vapor of said liquid and the vapor in said vessel being continuously in heat-interchanging relation with said source of heat whereby the same is maintained at a temperature above that of said container.

11. In combination with a source of heat and means to be controlled, a thermostat comprising a container and a motor vessel in communication therewith, a volatile liquid in said container which varies in volume as the temperature varies, the vapor of said liquid occupying the space in said vessel and being in continuous heat-interchanging relation with said source of heat, and operative connections between said motor vessel and said means to be controlled.

12. In combination with a source of heat and means to be controlled, a thermostat comprising a container having a volatile liquid partly filling the same and a motor vessel in communication therewith and containing the vapor of said liquid, the vapor in said vessel being continuously in heat-interchanging relation with said source of heat whereby said vapor is superheated, and operative connections between said motor vessel and said means to be controlled.

13. In combination with a source of heat and means to be controlled, a thermostat comprising a container having therein a volatile liquid which varies in volume as the temperature varies and a motor vessel in communication with said container and having the space therein occupied by the vapor of said liquid, the vapor in said vessel being continuously superheated by said source of heat, and operative connections between said motor vessel and said means to be controlled.

14. In combination with means to be controlled, a thermostat comprising a container having therein a volatile liquid which varies in volume as the temperature varies and a motor vessel the space within which is occupied by the vapor of said liquid, means whereby the vapor in said vessel is continuously superheated, and operative connections between said vessel and said means to be controlled.

15. In combination with means to be controlled, a thermostat comprising a motor vessel and a container having a volatile liquid and a vapor space therein, said thermostat being so arranged that only the vapor of said liquid occupies the space in said vessel, means for continuously superheating the vapor in said vessel, and operative connections between said vessel and said means to be controlled.

16. In combination with a source of heat and means to be controlled, a thermostat comprising a motor vessel operatively connected to said means to be controlled and a container having therein a volatile liquid which varies in volume as the temperature varies, said thermostat being so arranged that the space in said vessel is occupied by the vapor of said liquid and said vapor continuously maintained in superheated condition by said source of heat.

17. In combination with a valve-controlled heat-supply conduit, a thermostat comprising a container having a volatile liquid partly filling the same and a motor vessel operatively connected to said valve and in communication with said container, said vessel containing the vapor of said liquid, and a casing about said vessel continuously supplied with heating medium from said conduit.

18. In combination with a valve-controlled heat-supply conduit, a thermostat comprising a container having a volatile liquid partly filling the same and a motor vessel operatively connected to said valve and in communication with said container, said vessel containing the vapor of said liquid, a casing about said vessel, and a by-pass around said valve for continuously supplying said casing with heating medium.

19. In combination with a source of heat and means for controlling the same, a thermostat comprising a container having a volatile liquid partly filling the same and a motor vessel operatively connected to said controlling means and in communication with said container, said vessel containing the vapor of said liquid, and a heat-supplying means for continuously superheating the vapor in said vessel.

20. In a temperature regulator for dry kilns, in combination with valve mechanism for controlling the supply of heating medium, a thermostat comprising a container having a volatile liquid partly filling the same and subjected to the temperature within the kiln and a motor vessel operatively connected to said valve mechanism and communicating with said container, the vapor of said liquid occupying the space in said motor vessel and being continuously maintained by said heating medium at a temperature above that of the container.

21. In combination with a source of heat and means to be controlled, a thermostat comprising a container having a volatile liquid and a vapor space therein, and a motor vessel communicating with the vapor space in said container and in continuous heat-interchanging relation with said source of heat, and operative connections between said motor vessel and said means to be controlled.

22. In combination with a source of heat and means to be controlled, a thermostat comprising a container having therein a volatile liquid which varies in volume as the temperature varies and a motor vessel operatively connected to said means to be controlled and in communication with said container through an interposed tube, said vessel being in continuous heat-interchanging relation with said source of heat and containing the vapor of said liquid.

23. In combination with a source of heat and means to be controlled, a thermostat containing a volatile liquid, said thermostat comprising a vaporizing space and a motor vessel in continuous heat-interchanging relation with said source of heat and constituting a superheating space for the vapor of said liquid, and operative connections between said motor vessel and said means to be controlled.

24. In combination with a source of heat and means to be controlled, a thermostat containing a volatile liquid and operatively connected to said means to be controlled, said thermostat comprising a vaporizing chamber, a motor vessel in continuous heat-interchanging relation with said source of heat, and a tube interposed between the vapor space of said vaporizing chamber and said motor vessel.

25. In combination with means to be controlled, a thermostat comprising a container having a volatile liquid and a vapor space therein and a motor vessel operatively connected with said means to be controlled and in communication with the vapor space in said container, a heating chamber in heat-interchanging relation with said motor vessel to superheat the vapor therein, and means to supply said chamber continuously with a heating medium.

26. In combination with means to be controlled, a motor vessel operatively connected to said means, a container in communication with said vessel and having therein a volatile liquid which decreases in volume as the temperature rises, said vessel containing the vapor of said liquid, and means for continuously superheating the vapor in said vessel.

27. In combination with means to be controlled, a motor vessel operatively connected thereto, a container having a volatile liquid and a vapor space therein, said motor vessel being in communication with said vapor space, and means for continuously heating said vessel to maintain the temperature of the vapor therein above the temperature of said container.

28. In combination with means to be controlled, a thermostat operatively connected therewith and containing the continuously superheated vapor of a volatile liquid which gradually decreases in volume as the operating temperature of said thermostat is approached.

29. A volatile fluid thermostat including a container and a motor vessel communicating therewith, said container having therein a volatile liquid and a vapor space and said vessel containing the vapor of said liquid and continuously maintained at a temperature above that of said container.

30. A volatile fluid thermostat including a container and a motor vessel communicating therewith through an elongated interposed tube, said container having therein a volatile liquid and a vapor space and said vessel containing the vapor of said liquid and continuously maintained at a temperature above that of said container.

In testimony whereof I have signed this specification.

WESTON M. FULTON.